United States Patent [19]
Seaver et al.

[11] Patent Number: 5,822,152
[45] Date of Patent: *Oct. 13, 1998

[54] ULTRA-SLIM DISK STORAGE UNIT WITH AN ENCLOSED CIRCUIT BOARD AND A HYDRODYNAMIC BEARING ASSEMBLY WHICH FORMS A STABLE MENISCUS

[75] Inventors: Jay R. Seaver; Mark A. Diel, both of Boulder; Forrest Titcomb, Colorado Springs, all of Colo.

[73] Assignee: Maxtor Corporation, Longmont, Colo.

[*] Notice: The term of this patent shall not extend beyond the expiration date of Pat. Nos. 5,328,271 and 5,488,523.

[21] Appl. No.: 751,354

[22] Filed: Nov. 18, 1996

Related U.S. Application Data

[60] Continuation of Ser. No. 564,908, Nov. 29, 1995, abandoned, which is a division of Ser. No. 74,215, Jun. 9, 1993, Pat. No. 5,488,523, which is a continuation-in-part of Ser. No. 881,739, May 6, 1992, Pat. No. 5,328,271.

[51] Int. Cl.⁶ .......................... G11B 17/02; G11B 33/12; H05K 7/02; F16C 32/06
[52] U.S. Cl. .................... 360/99.08; 360/97.01; 361/685; 361/736; 384/108; 384/610
[58] Field of Search .................. 360/97.01, 97.02, 360/98.01, 99.06, 99.08, 99.12, 104; 361/684, 685, 725, 736, 737; 369/269, 270, 75.1; 384/108, 245, 610; 310/90

[56] References Cited

U.S. PATENT DOCUMENTS

| | | | |
|---|---|---|---|
| 4,116,500 | 9/1978 | Hüber | 384/108 |
| 4,639,863 | 1/1987 | Harrison et al. | 360/97.01 |
| 4,894,739 | 1/1990 | Kobayashi | 360/97.02 |
| 4,908,793 | 3/1990 | Yamagata | 360/97.01 |
| 5,153,794 | 10/1992 | Hinlein | 360/104 |
| 5,243,495 | 9/1993 | Read et al. | 360/97.01 |
| 5,245,486 | 9/1993 | Hachiya et al. | 360/97.01 |
| 5,251,082 | 10/1993 | Elliott et al. | 360/97.01 |
| 5,260,852 | 11/1993 | Ma | 361/685 |
| 5,284,391 | 2/1994 | Diel et al. | 384/108 |
| 5,328,271 | 7/1994 | Titcomb | 384/108 |
| 5,488,523 | 1/1996 | Seaver et al. | 360/99.08 |

FOREIGN PATENT DOCUMENTS

| | | | |
|---|---|---|---|
| 0542183 | 5/1993 | European Pat. Off. | |
| 60-200221 | 10/1985 | Japan | 384/108 |
| 02-186118 | 7/1990 | Japan | 384/108 |
| 2254726 | 10/1992 | United Kingdom | |

OTHER PUBLICATIONS

Leibson, Steve H., "Low–Power, 1.8–in. Hard Disk Drive Holds 21.4 Mybtes, Withstands 200g shocks," EDN, v36, h10, p. 99(1), Sep. 16, 1991.

*Primary Examiner*—Craig A. Renner
*Attorney, Agent, or Firm*—Sheridan Ross P.C.

[57] ABSTRACT

An ultra-slim disk storage unit includes a frame and a cover for engaging the frame to create first and second enclosed spaces therein. In one of the enclosed spaces a disk drive assembly is housed which provides readable and writable information storage on a disk medium. Electronics for controlling the operation of the disk drive assembly is housed on a board contained within the second enclosed space. A connector provides coupling to the disk drive assembly electronics for external electrical connection to the disk storage unit. The connector is disposed along a peripheral side of the frame in accordance with PCMCIA standards.

17 Claims, 7 Drawing Sheets

ULTRA-SLIM DISK STORAGE UNIT WITH AN ENCLOSED CIRCUIT BOARD AND A HYDRODYNAMIC BEARING ASSEMBLY WHICH FORMS A STABLE MENISCUS

RELATED APPLICATIONS

This application is a continuation of U.S. application Ser. No. 08/564,908, filed on 29 Nov. 1995, now abandoned, which is a divisional of U.S. application Ser. No. 08/074,215, filed Jun. 6, 1993 now U.S. Pat. No. 5,488,523, issued on 30 Jan. 1996, which is a continuation-in-part of U.S. application Ser. No. 07/881,739, filed 06 May 1992, now U.S. Pat. No. 5,328,271, issued on 12 Jul. 1994.

FIELD OF THE INVENTION

This invention relates generally to the field of information storage units; more particularly, to rigid-disk drive units configured with components which permit dramatic scaling of the unit's size. The invention further relates to the field of portable information storage units which may be connected to computer systems.

BACKGROUND OF THE INVENTION

The trend in the disk drive industry over the past several years has been to scale down the size or form factor of the package housing the disk drive assembly. For example, shrinking form factors have reduced the size of disks from 5.25" down to 3.5", 2.5", 1.8" and 1.3" diameters in recent years. At the same time, advances in recording technology have increased track density so as to achieve increased data storage capacity, despite the reduction in form factor size.

Much of the reduction in the size of the disk drive assembly unit has been brought about by simply shrinking the dimensions of the various components. For example, by reducing the size of the spindle motor, the actuator bearings, the disk diameter and the surrounding enclosure the size of data storage units has been reduced dramatically. Another way that size has been reduced—particularly in the vertical (i.e., height) dimension has been by reducing the number of disks mounted to the spindle motor. In other words, eliminating many of the of disks, within the enclosure, has allowed a corresponding reduction in the height or thickness of the disk storage unit. However, to further reduce the overall size beyond current limits—and especially to reduce the thickness of the disk storage unit—a radical new approach to the design and integration of the components which make up the drive is required.

In conjunction with the trend toward reducing the size of disk storage units, there has also been a corresponding trend in the computer industry toward creating ever more portable computing resources. For instance, many modern computer systems manufactured today have the capability of providing standard connections to removable memory cards. To further advance this technology, the Personal Computer Memory Card International Association (PCMCIA) has adopted certain connector dimensions, interfaces, and configurations as standards for the computer industry. In this respect, PCMCIA compatible solid-state memory cards are manufactured to have certain outside dimensions and connector configurations which allow installation into a standard PCMCIA interface with a host computer. Currently, there are three types of PCMCIA standard card sizes: The Type III card which has a vertical thickness of 10.5 mm, the Type II card, which has a thickness of 5.0 mm, and the Type I card which is 3,3 mm thick. The length and width of a PCMCIA memory card are also rigidly defined by the PCMCIA standards.

What is desirable then, and what the present invention achieves, is a disk storage unit packaged in a PCMCIA compatible memory card. The invention involves packaging of a 1.3" disk drive in an enclosure which has the same dimensions as a PCMCIA memory card of the Type I, Type II, or Type III dimension. A host computer can communicate with the disk storage unit of the present invention using a standard PCMCIA interface. In the past, previous hard disk drive units have not offered removability and portability in such a small package. Thus, the packaging of a disk drive unit in the PCMCIA card provides removable and portable high capacity data storage at a relatively low cost. As will be seen, the accomplishment of PCMCIA compatible dimensions for a disk storage unit are made possible by advances in the design of the internal disk drive assembly components, and in the packaging of the drive together with the electronic circuits used in controlling the reading and writing of information to the disk.

BRIEF DESCRIPTION OF THE DRAWINGS

The present invention is illustrated by way of example and not limitation in the figures of the accompanying drawings, in which like references indicate similar elements, and in which.

SUMMARY OF THE INVENTION

In one embodiment, the ultra-slim storage unit of the present invention includes a frame and a cover means for engaging the frame to create first and second enclosed spaces therein. The enclosed spaces are disposed in the same general plane adjacent to each other. A disk drive assembly means which provides for readable and writeable information storage on a disk medium is housed on one of the enclosed spaces. An electronic means for controlling the operation of the disk drive assembly means is housed on a circuit board contained within the second enclosed space. An interconnect means provides coupling to the electronic means for external electrical connection to the disk storage unit. The interconnect means is disposed along a peripheral side of the frame.

In a second embodiment, the ultra-slim disk storage unit of the present invention includes a rectangular frame having a central opening which houses a disk drive assembly means. The disk drive assembly means provides readable and writable information storage on a disk medium and is enclosed by a base plate and a top cover. The disk drive assembly means is mounted to the base plate. A printed circuit board housing an electronic circuit means for controlling the operation of the disk drive assembly means is mounted above the top cover. The printed circuit board cover is mounted to the frame so that the printed circuit board is enclosed within a space disposed either above or below the top cover. An interconnect means is coupled to the electronic circuit means to provide external electrical connection to the disk storage unit. The interconnect means is disposed along a peripheral side of the rectangular frame.

In further embodiments, the disk drive assembly means includes a spindle or hub which supports an annular rigid-disk which provides the recording medium for the storage of information. The hub or spindle has a longitudinal axis which is disposed within the enclosed space. A hydrodynamic bearing permits rotational movement of the hub within the enclosed space. The bearing comprises a pair of balls disposed within a pair of corresponding sockets. The balls and sockets are aligned along a longitudinal axis on opposite sides of the hub. The motor means for rotating the hub includes at least a first coil attached to either a top or bottom cover of the cover means. An annular magnet is attached to the hub, and a cylindrical outer hub is attached to the magnet. The disk medium is attached to this outer motor hub so that upon energizing of the coil, the hub is caused to rotate about the longitudinal axis.

DETAILED DESCRIPTION

An ultra-thin disk storage unit is described. In the following description, numerous specific details are set forth such as dimensions, material types, spacings, etc., in order to provide a thorough understanding of the present invention. However, it will be obvious to one skilled in the art that the invention may be practiced without these specific details. In other instances, well-known elements and processing techniques have not been shown in particular detail in order to avoid unnecessarily obscuring the present invention.

Figure 1:
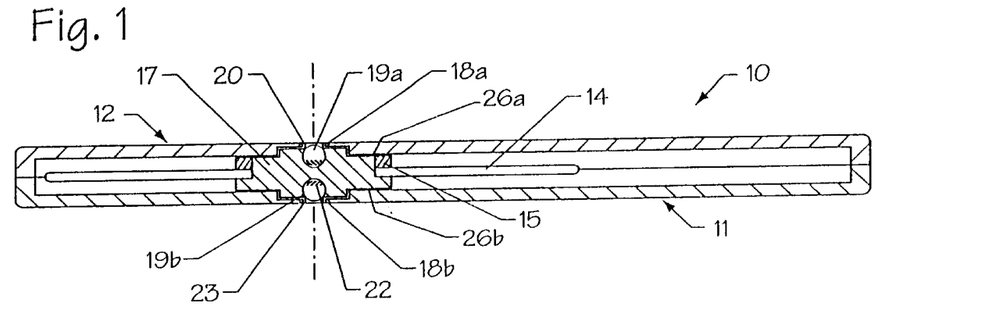
FIG. 1 is a cross-sectional side view of an ultra-slim disk storage unit.

FIG. 1 illustrates a cross-sectional side view of an information storage unit 10 incorporating the hydrodynamic bearing assembly of the present invention. Information storage unit 10 includes a top cover plate 12, which is securely attached to a base plate 11 by means of screws disposed about the peripheral areas of the plates. Typically, both base plate 11 and top cover 12 comprise a metal or metal alloy such as aluminum, however, other rigid materials may also be used. When assembled, the two plates 11 and 12 form a central cavity there between.

Within the cavity formed by plates 1 1 and 12 resides a spindle or hub 17. Hub 17 supports an annular rigid-disk 14 about its peripheral surface. Rigid-disk 14 is secured by means of a clamp 15 which may comprise a metal ring affixed to the hub so as to seat rigid-disk 14 firmly against the outer extending shelf portion of hub 17. Most often, rigid-disk 14 comprises aluminum or an aluminum alloy, but may also comprise SAE660 bronze. Of course, other metals or rigid materials may also be used. As is well-known in the information recording art, rigid-disk 14 commonly comprises a magnetic surface material suitable for storage of information in the form of magnetic transitions. In other instances, disk 14 may comprise magneto-optical or other similar materials useful for long-term information storage.

Notice that in FIG. 1, hub 17 includes a pair of spherical sockets 18a and 18b located on opposite sides (i.e., in the top and bottom graces) of the hub's body. These sockets are centrally located along a longitudinal axis of the hub. Disposed within each of the spherical sockets 18 is a ball 19. Balls 19 are aligned through the center of hub 17 to form a bearing mechanism within sockets 18, as will be described in more detail below.

Note that the upper ball 19a is shown being affixed to cover plate 12 by means of an adhesive 20, such as epoxy glue. Similarly, the lower ball 19b is affixed by means of an adhesive to base plate 11.

By way of example, balls 19 may comprise 440C stainless steel formed to a diameter of approximately 0.05 inches. Ceramic materials may also be used. This remarkably small dimension allows the entire information storage unit 10 to occupy a minimum space, currently on the order of 3,3 mm high—which is an unprecedented dimension in the field of magnetic recording systems. The balls themselves are seated within an annular depression zone or hollow formed in both cover plate 12 and base plate 11. These depressions provide a means for insuring proper alignment of the balls to their respective sockets.

Instead of using spherical balls glued to each of the plates, any sort of a knob member having an spherical outer surface which extends into each socket could also be used. For instance, a pair of protruding knob members could be machined into the respective plates. Alternatively, knobby pins could be screwed or otherwise affixed into the plates at the appropriate locations. The only requirement of this aspect of the invention is that the protruding member present a correspondingly spherical surface to the socket. (The same is true of each of the sockets with respect to the balls, or knob members.) Thus, a great variety of configurations are possible.

Figure 2:
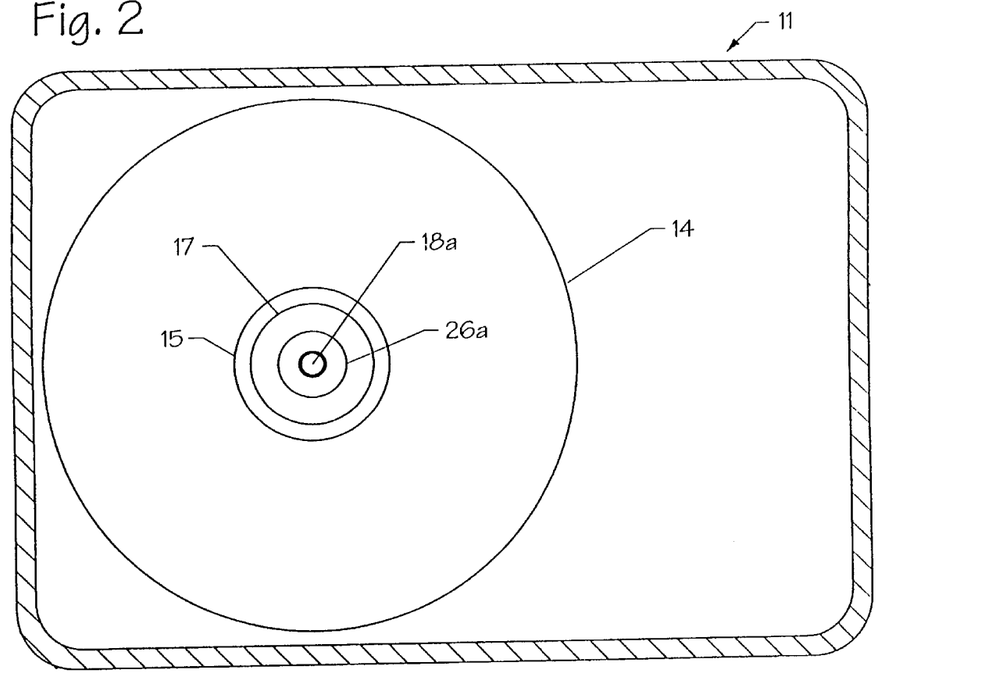
FIG. 2 is a top view of the storage unit of FIG. 1, as shown with the cover plate removed.

FIG. 2 illustrates a top view of the information storage unit of FIG. 1 with cover plate 12 removed. Note the axial location of socket 18a in relation to hub 17 and disk 14. Concentric about socket 18a is an upper hub surface 26a. Beyond that is located disk clamp 15.

Figure 3:
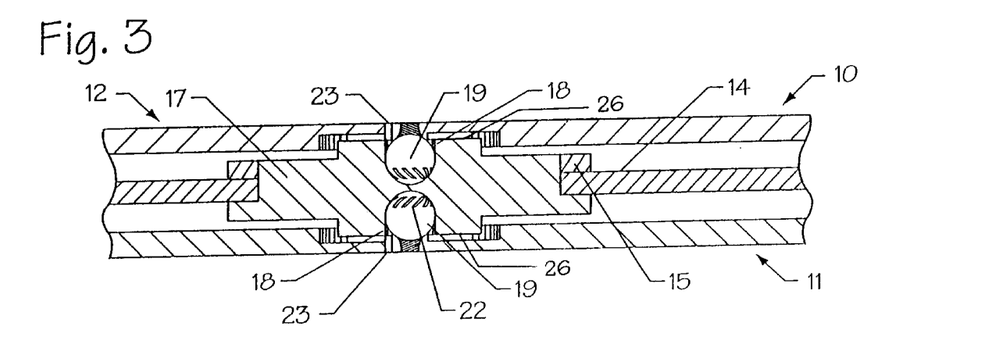
FIG. 3 is a side view of one embodiment of the hydrodynamic bearing assembly utilized in the present invention.

FIG. 3 shows an expanded view of the hydrodynamic bearing assembly included in the present invention. Observe that FIG. 3 illustrates more clearly the position of spherical balls 19 to their respective lower and upper plate members 11 and 12. For example, each of the spherical balls 19 is shown bonded into an annular depression zone 20 to firmly seat the balls into cover plate 12 and base plate 11. An epoxy adhesive may be used to bond each ball to its respective plate member.

Figure 4:
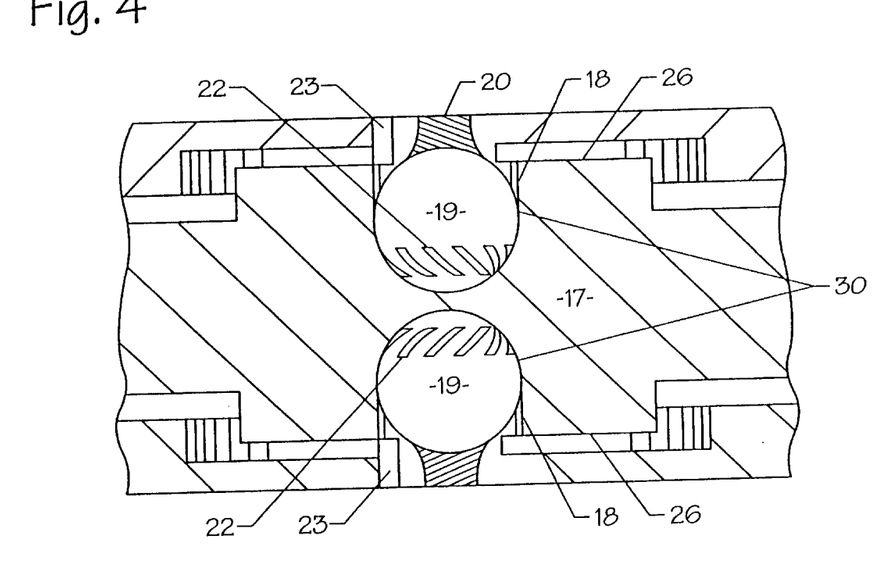
FIG. 4 is a more detailed view of the assembly of FIG. 3.

An important aspect of the bearing assemblies is the groove pattern 22 which is coined, etched, or otherwise machined into the surface of each ball 19 or socket 18. FIGS. 3 and 4 show this diagonal groove pattern extending across a wide portion of the upper (or lower) hemisphere of ball 19. Grooves 22 are formed at an angle of approximately 37° to the longitudinal direction of the ball, and to a depth which is roughly equal to the minimum clearance between the ball and the socket (approximately 50–500 microinches). Although the illustrated pattern comprises a series of rectilinear markings, it is understood that a multitude of different patterns may be utilized without detracting from the operation of the invention.

The purpose of grooves 22 is to develop hydrodynamic pressure within the clearance spaces formed between the balls and sockets. This pressure is developed by means of two converging surfaces: the physical surfaces comprising the outer surface of ball 19 and the inner, moving surface of socket 18. In accordance with well understood principles of physics, the shape of the bearing surface determines the pressure distribution within this gap region. The optimal groove pattern for a particular embodiment, of course, is dependent upon many factors—including the viscosity of the lubricating fluid sealed within the gap, the rotational speed of the hub, the various materials employed and their associated surface finish, as well as the volume of space occupied by the lubricant. By way of example, a lubricant comprising a synthetic oil manufactured by William F. Nye Corp. of Bedford, Mass.—known as polyalphaolefin—can be used. Ordinary mineral oil or other synthetics could also be used.

Figure 5:
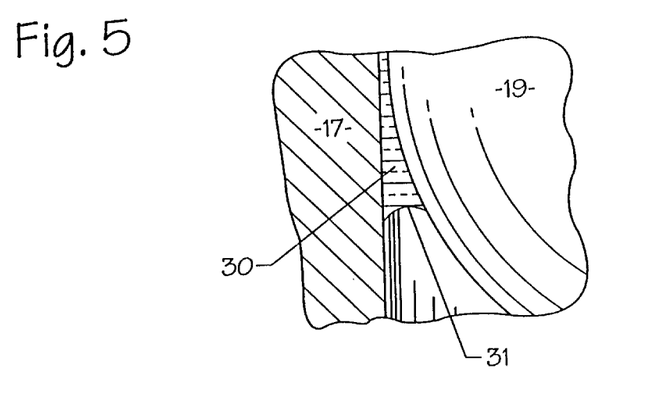
FIG. 5 is an expanded view of a portion of FIG. 4 which more clearly illustrates the capillary seal used in the bearing of FIG. 3.

The lubricant oil 30 is delivered into the clearance spaces between balls 19 and sockets 1 8 during manufacturing by means of lubricant fill holes 23. Holes 23 are machined into cover plate 12 and base plate 11 at a location near the edge of each spherical socket 18. This facilitates the administering of the lubricant to the ball/socket interface by means of a syringe. When the hub is rotated at high speed during operation, lubricating fluid 30 is held within the clearance space or gap by means of the diverging capillary action created between the moving socket and stationary ball. The surface tension forces balance the pressure forces forming a stable meniscus 31. This is shown most clearly in FIG. 5.

To prevent fluid leakage from the clearance spaces, upper and lower surfaces 26a and 26b, indicated in FIG. 1 and surfaces 26 indicated in FIGS. 3 and 4, of hub 17 may be coated with a barrier film. The barrier film comprises a substance characterized by its lack of affinity for combining with the lubricant. In other words, the barrier film prevents the oil from wetting 26 in FIGS. 3 and 4 and, in FIG. 1, surfaces 26a and 26b surfaces so as to continue lubricating fluid 30 within the clearance space formed at the ball/socket interface. By way of example, the barrier film may comprise a polymer film known by the chemical name polydihydropentadecafloroctaimethylacrolate. This chemical is sold under the tradename NYEBAR™, and is also manufactured by the William B. Nye Corp., of Bedford, Mass.

Figure 6:
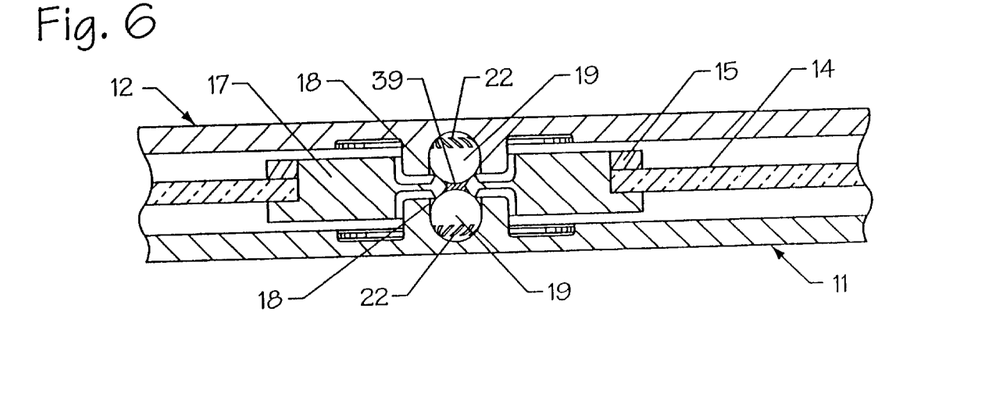
FIG. 6 illustrates another embodiment of the hydrodynamic bearing assembly utilized in the present invention.

FIG. 6 shows another embodiment of the hydrodynamic bearing assembly utilized in the present invention. In FIG. 6, sockets 18 are shown formed integrally within cover plate 12 and base plate 11. This is opposite to the previous embodiment wherein the sockets were formed with the hub. Furthermore, in the embodiment of FIG. 6, balls 19 are attached to the top and bottom sides of hub 17. Hub 17 includes a pair of oppositely opposed annular depression zones 39 for seating balls 19 in alignment along a longitudinal axis of the hub. As before, balls 19 are bonded to hub 17 by means of an epoxy adhesive.

The main difference, of course, between the embodiment of FIG. 6 and the previous embodiment is that balls 19 rotate with hub 17 while the sockets 18 (disposed in plates 11 and 12) remain stationary. Note that the embodiment of FIG. 6 also includes grooves 22 formed into the outer surface of balls 19. Alternatively, the groove may be formed into the spherical surface of sockets 18. It is appreciated that in any of the described embodiments, grooves 22 can be located either on the outer surface of balls 19, or on the inner surface of spherical sockets 18.

One of the advantages of the bearing assembly of FIG. 6 is that as the metal surfaces of balls 19 spin, the centrifugal force generated in the lubricating fluid is such that the lowest energy state of the fluid is where the fluid is disposed well within the clearance space between the ball and socket. In other words, the centrifugal force experienced by the fluid will tend to maintain the fluid away from the area near the attachment point of the ball to the hub. Consequently, there is much less chance that the lubricating fluid will be lost from the clearance spaces over the lifetime of the drive. Because the chance of fluid loss is in the assembly of FIG. 6, this design functions well without the need for a barrier film.

Figure 7:
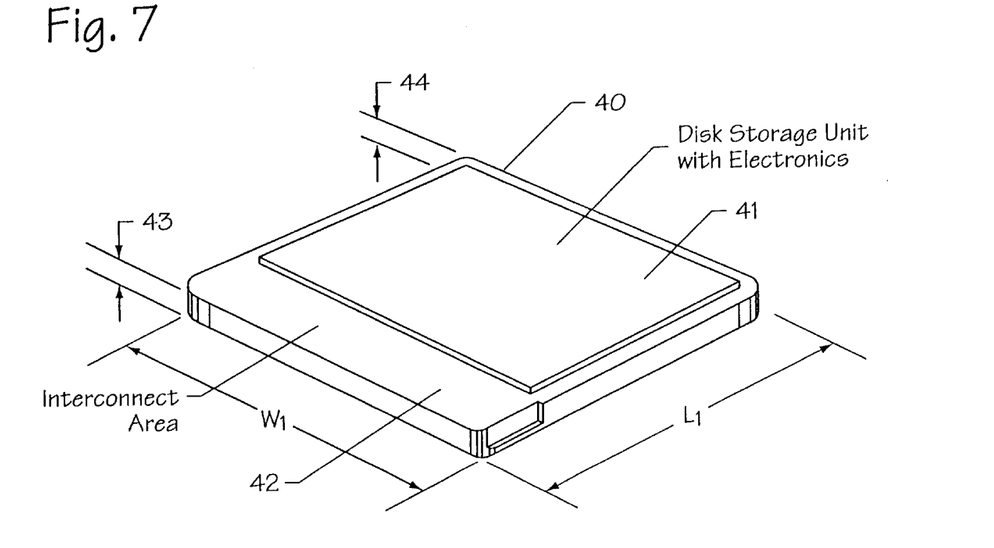
FIG. 7 is a perspective view of a particular embodiment of an ultra-slim disk storage unit.

With reference to FIG. 7 there is shown a perspective view of the disk storage unit of the present invention. The embodiment illustrated in FIG. 7 is a storage unit packaged and a memory card compatible with PCMCIA standards. Internally, the drive includes a 1.3" disk together with the read/write electronics for controlling the drive and for interfacing with a computer system. Package 40 includes the disk storage unit with electronics in an area 41 disposed within an opening of a rectangular frame. Along one side of the rectangular frame is an interconnect area 42 which includes connectors compatible with a standard PCMCIA interface. The host computer communicates to the disk drive using the PCMCIA interface through the electronic interconnect area 42.

Consistent with standard PCMCIA dimensions, the width $W_1$ of unit 40 is 54.0 mm wide, while the length $L_1$ is 48.1 mm long. In the embodiment of FIG. 7, the electronics are disposed on a printed circuit board directly above the disk storage unit so that the thickness of the disk storage unit with electronics area 41 is shown by arrows 44 to be slightly thicker than the thickness of the frame 43. Consistent with the PCMCIA Type II standards, thickness 44 is approximately 5.0 mm. The vertical dimension of the frame, i.e., the interconnect area 42, is approximately 3.3 mm thick. This ultra-slim dimension for a disk storage unit is achieved by the use of radically different motor and bearing designs, as will be discussed in more detail shortly.

Figure 8:
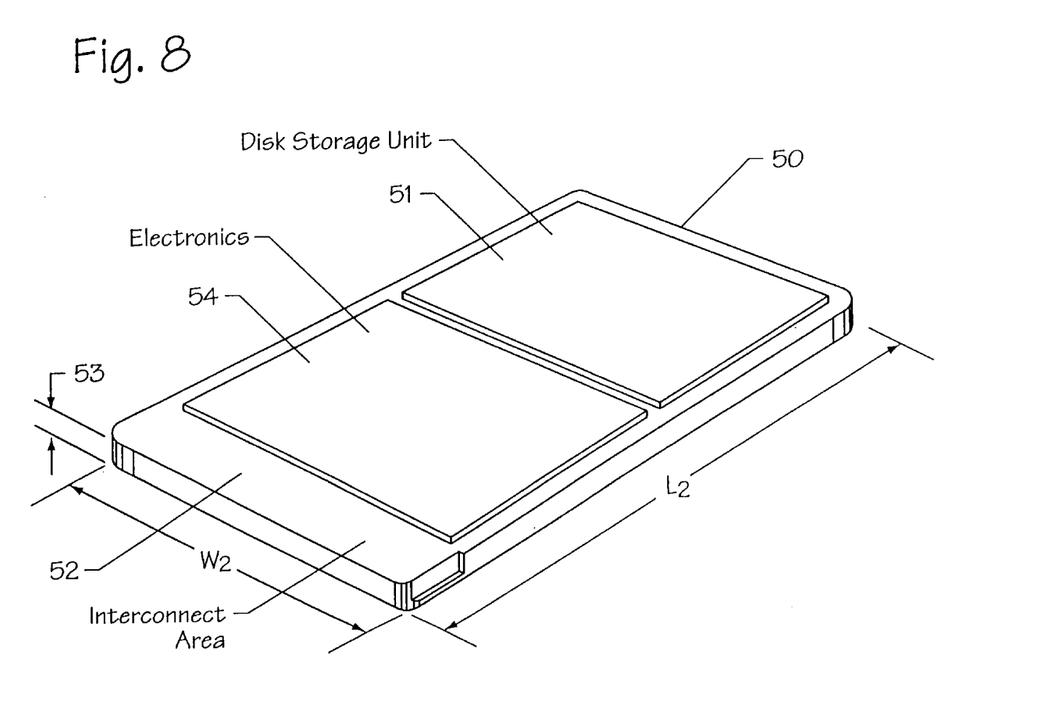
FIG. 8 is a perspective view of another embodiment of an ultra-slim disk storage unit.

FIG. 8 illustrates an alternative embodiment of invention in which a disk drive card 50 includes two separate areas: a first area enclosed within the frame houses the disk storage unit 51, whereas the second area adjacent to disk storage unit 51 houses the electronics board. The electronics area is shown in FIG. 8 by area 54. Similar to the embodiment of FIG. 7, the frame of package 50 includes an area 52 which provides the interconnect for a standard PCMCIA interface. The embodiment of FIG. 8 has a thickness 53 which is compatible with the PCMCIA Type I memory card standards. The standard PCMCIA Type I thickness is approximately 3.3 mm thick. The dimensions $W_2$ and $L_2$ for the disk drive 50 of FIG. 8 are 54.0 mm and 85.6 mm, respectively. Practitioners in the art will appreciate that packaging of a disk drive unit in a PCMCIA card provides removable and portable high capacity data storage at a very low cost.

Figure 9:
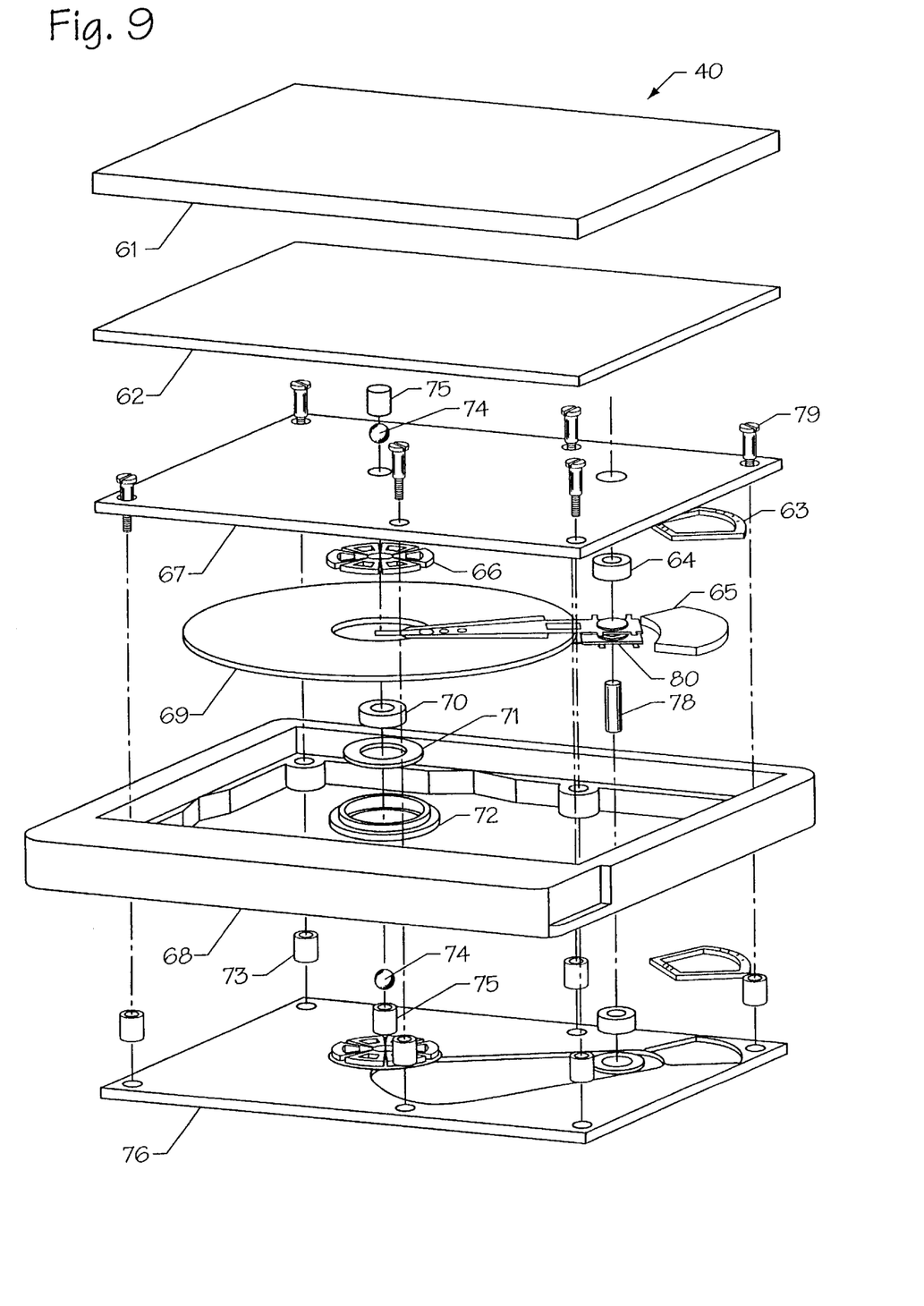
FIG. 9 is an exploded view of the disk storage unit of FIG. 7.

With reference now to FIG. 9, there is shown an exploded view of the disk storage unit of FIG. 7. Beginning with the motor and hub assemblies, there is shown a pair of spin bearings 74 which are disposed within cups or sockets 75 in accordance with the hydrodynamic spindle bearing discussed previously. Each of the spin bearings 74 is attached to a cylindrical inner hub 70. Also attached to the inner hub is an annular spin magnet 71, which may simply be glued or otherwise attached to inner hub 70. Outer hub 72 fits around spin magnet 71 and is likewise attached to spin magnet 71. Note that outer hub 72 includes a outer ring-like shelf for supporting disk 69. Stationary coils 66 are attached to the top and bottom covers using ordinary glue such that when the coils are energized they cause spin magnet 71 to rotate about the longitudinal axis formed by spin bearings 74 and bearing cups 75. Preferably, the stationary coils are recessed into the base plate 76 and top cover 67 which encloses the disk storage unit within the PCMCIA Type II frame 68.

Figure 12:
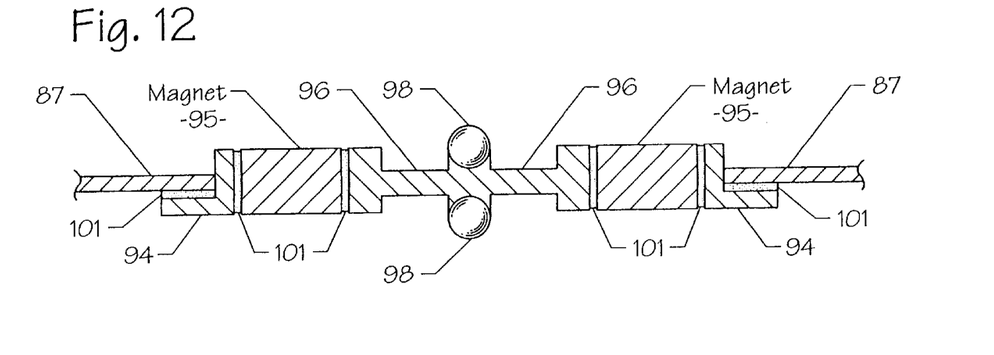
FIG. 12 is a conceptual side view of the hub/disk assembly utilized in the present invention.

FIG. 12 shows a conceptual cross-sectional view of the motor and hub assembly of the present invention. Note that in FIG. 12, the inner hub 96 can either be attached to the spin bearing 98, or include sockets for receiving the bearings 98 in accordance with the various embodiments of the hydrodynamic spindle bearing disclosed in the present application. Spin magnet 95 is shown attached to the outer circumference of hub 96 by means of an ordinary adhesive 101. For example, adhesive 101 may comprise epoxy glue. Outer hub 94 is shown attached to magnet 95 in a similar manner. Likewise, disk 87 may be bonded or attached to the outer hub 94 using adhesive 101.

Although the embodiment of FIG. 9 illustrates a pair of spin coil 66 disposed on top and bottom covers of the enclosure, it is appreciated that in certain implementations, only one set of spin coils may be used. That is, certain implementations may have spin coils on either the top cover or the bottom base plate, but not both. In addition, the coils themselves may also include small poles that fit inside the coil elements to enhance the magnetics of the motor drive.

The actuator of the disk storage unit 40 shown in FIG. 9 includes a pair of voice coil motor (VCM) bearings 64 attached to an actuator bearing shaft 78. Actuator shaft 78 passes through and is attached to actuator 80 which supports the head suspension assembly used to position the transducers over disk 69 during and writing of information to the magnetic medium. In a current embodiment, the actuator arm functions as the mounting plate so that the flexure/head assembly can be attached directly to the actuator. In other words, rather than having the heads attached to a separate boss which is then staked to an actuator arm, the need for the boss is obviated in the present invention so that all is left is the flexure which can then be attached to the actuator body. Thus, the need for a mounting pad is eliminated in this embodiment. The flexure arms themselves comprise approximately three mils stainless steel that is either bonded or welded directly to the actuator arm. The voice coil motor bearings 64 comprises a ball bearing assembly.

Figure 13:
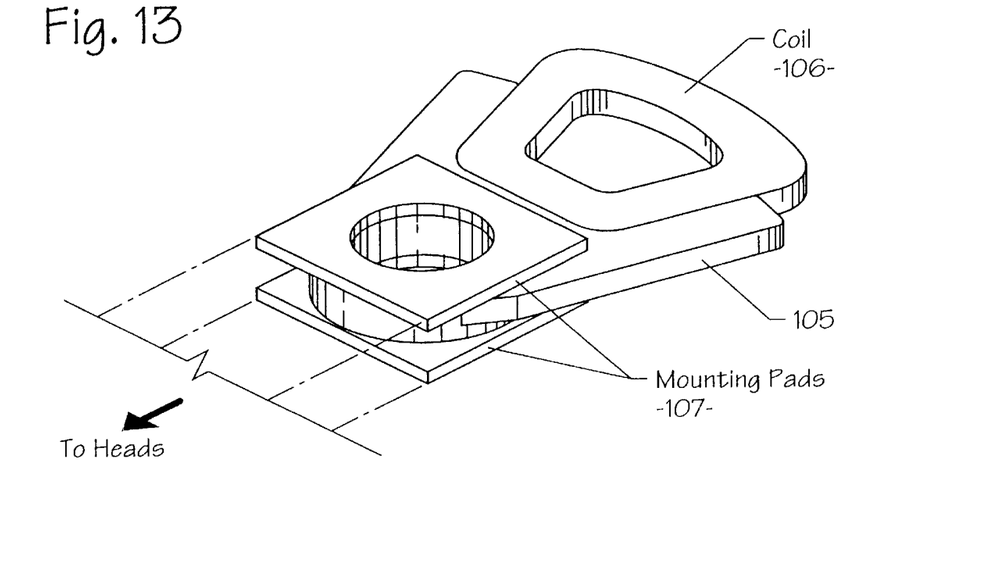
FIG. 13 is a perspective view of a moving coil actuator that may be utilized in the present invention.
Figure 14:
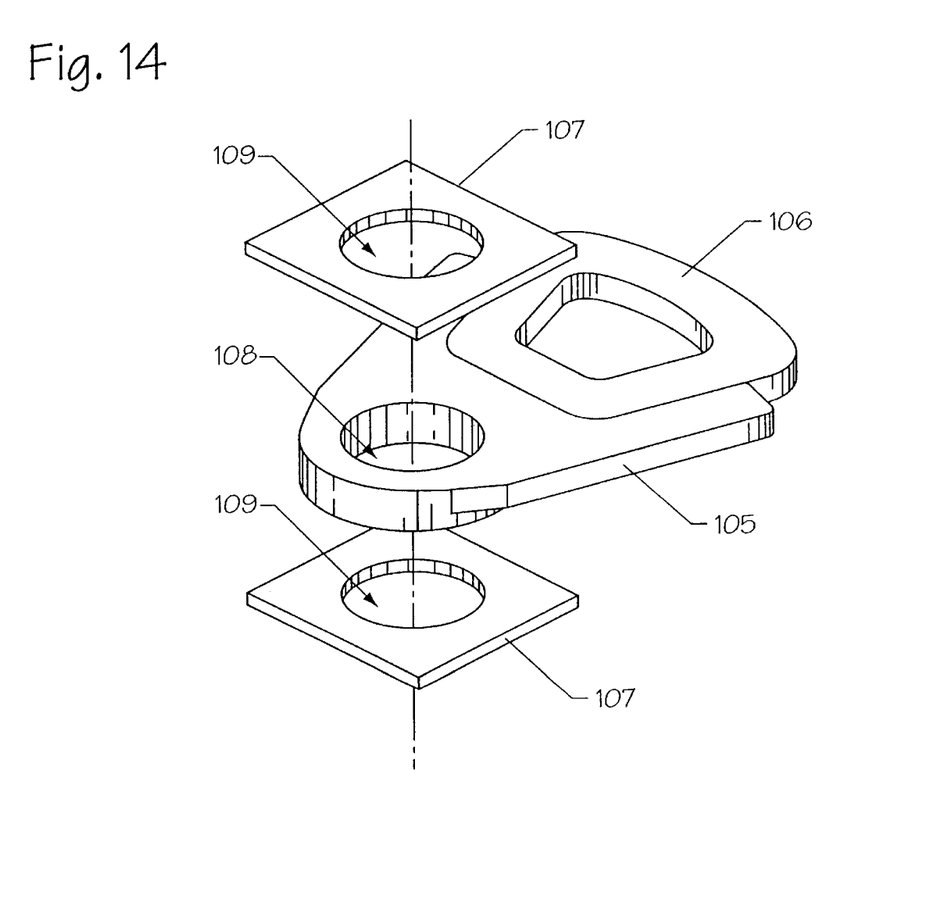
FIG. 14 is a exploded view of the actuator of FIG. 13.

Of course, it is appreciated that other embodiments of the present invention may utilize actuators which include mounting pads. By way of example, FIGS. 13 and 14 show a moving coil actuator consisting of an actuator body 105, a coil 106, and mounting pads 107. Coil 106 is attached to the rear of actuator body 105, with mounting pads 107 being attached at the opposite end. When fully assembled, circular openings 109 of pads 107 are aligned to opening 108 of body 105. Obviously, the multi-piece actuator illustrated in FIGS. 12 and 13 can also be manufactured with the body and mounting pads integrally attached.

With continuing reference to FIG. 9, attached to the rear of actuator 80 is a voice coil motor magnet 65, which may comprise a steel plate onto which flat magnets are bonded. Similar to the design of the motor, actuator coils 63 are preferably attached to base plate 76 and top cover 67 so that upon energizing of coils 63, actuator 80 pivots about an axial point to position the transducers over the appropriate track of disk 69. In the present embodiment, actuator 80 may comprise aluminum or stainless steel.

As is apparent from the exploded view of FIG. 9, when the disk storage unit is fully assembled, it is entirely captured within the space defined by frame 68, base plate 76 and top cover 67 using screws 79 and spacers 73. As previously mentioned, the thickness of frame 68 is approximately 3.3 mm thick consistent with PCMCIA standards . Frame 68 includes an inner shelf which supports top cover 67. This allows room for the printed circuit board (PCB) 62 to be mounted directly above top cover 67. PCB 62 includes the electronic circuits for controlling the disk storage unit. The entire drive unit is sealed and fully enclosed by PCB cover 61, which encloses the printed circuit board 62 within the opening provided by frame 68. Thus, the embodiment of FIG. 9 satisfies the PCMCIA Type II format requirements in that the total thickness—including the printed circuit board cover—is about 5.0 mm thick.

Figure 10:
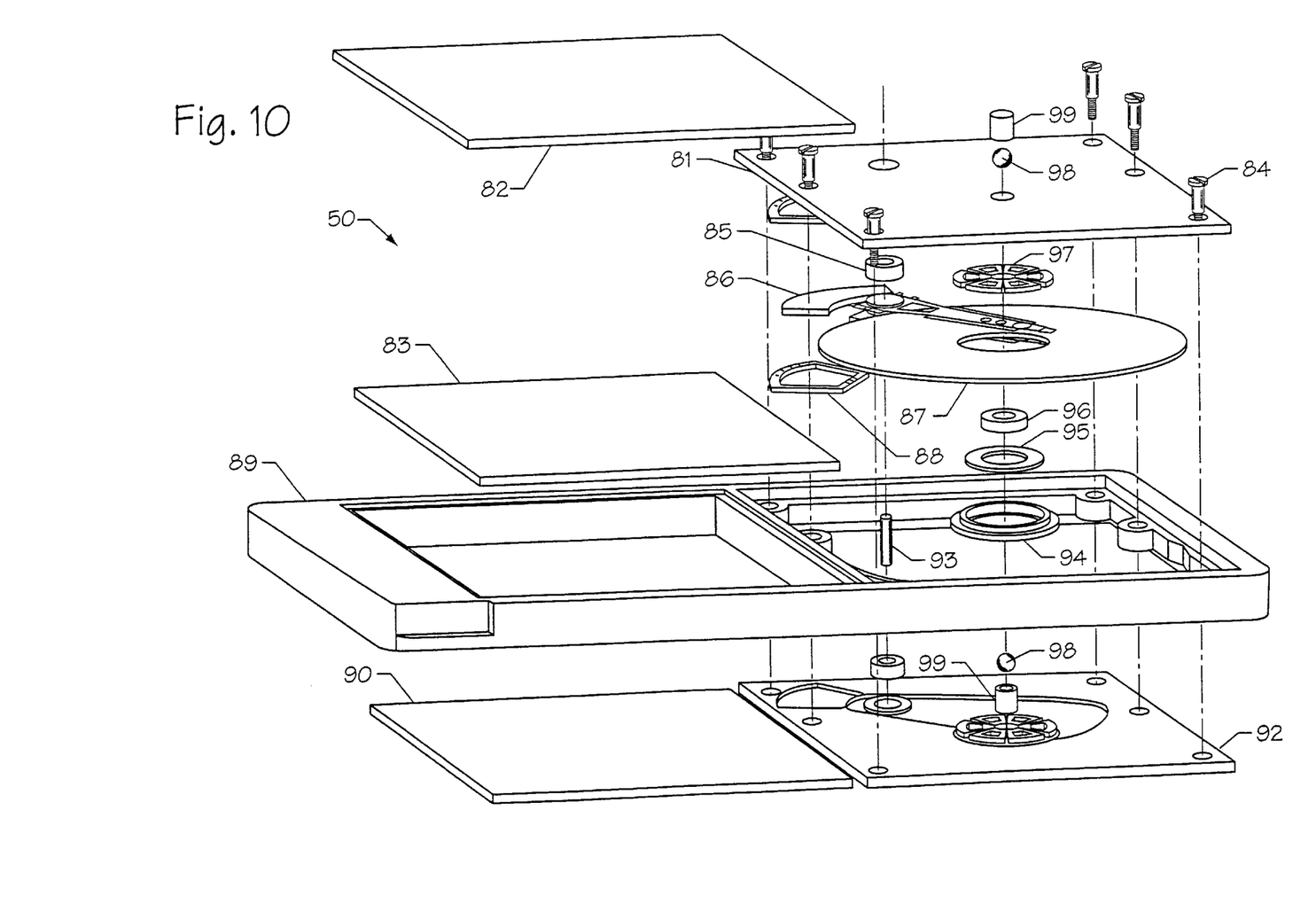
FIG. 10 is an exploded view of the disk storage unit of FIG. 8.

With reference now to FIG. 10, there is shown an exploded view of the disk storage unit 50, previously shown in FIG. 8. The internal drive assembly is virtually the same as that utilized in the embodiment of FIG. 9, with the exception that the storage unit is enclosed within a space which is separate from the space enclosing the drive's electronic board. The hub and motor assembly includes an inner hub 96 onto which are mounted spin bearings 98. Spin bearings engage the sockets or cups 99 which are attached to top cover 81 and base plate 92, respectively. An annular spin magnet 95 is attached to inner hub 96, and an outer hub 94 is attached to spin magnet 95. Outer hub 94 includes a shelf-like portion along its circumference for attachment of disk 87. Spin coils 97 are mounted into depression zones into the base plate 92 and top cover 81. As before, spin coils 97 are stationary so that upon energizing of coils 97, spin magnet 95 rotates in unison with inner hub 96, outer hub 94, and disk 87.

The actuator assembly for the storage unit 50 includes an actuator shaft 93 mounted to voice coil motor (VCM) bearings 85. A VCM magnet 86 is disposed between coils 88 and is mounted on one side of the actuator, while a pair of flexure members extend from the other end of the actuator arms. Screws 84 secure the top cover 81 to base plate 92 in a way that sandwiches the drive assembly into the enclosed space bounded by frame 89. In this respect, note that frame 89 includes an inner shelf around its periphery. This inner shelf allows the top cover to be mounted flush with the top of frame 89, thus allowing the drive to be somewhat thinner than the drive of FIG. 9.

Directly adjacent to the space enclosing the disk storage unit is a space accommodating the printed circuit board which houses the electronics for controlling the reading and writing of information to the disk medium. FIG. 10 illustrates the printed circuit board 83 housed within the second enclosure formed by frame 89. Printed circuit covers 82 and 90 enclose the printed circuit board within the frame. In a present embodiment, the cover plates 82 and 90 comprise ordinary steel.

Figure 11A:
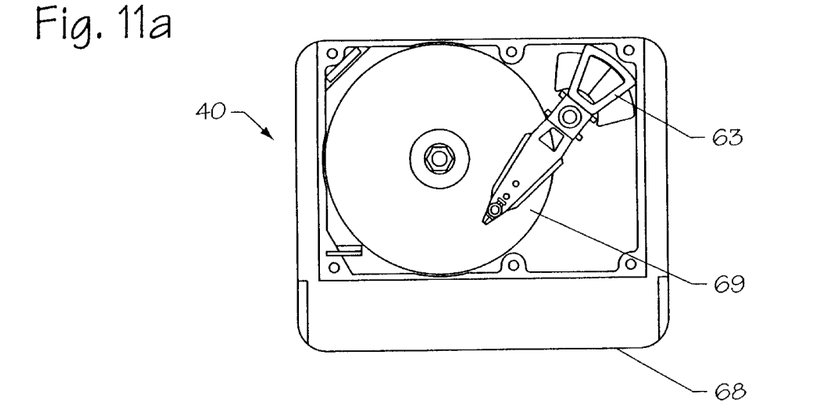
FIGS. 11A & 11B show a top view with the cover removed of the storage units of FIGS. 7 and 8, respectively.
Figure 11B:
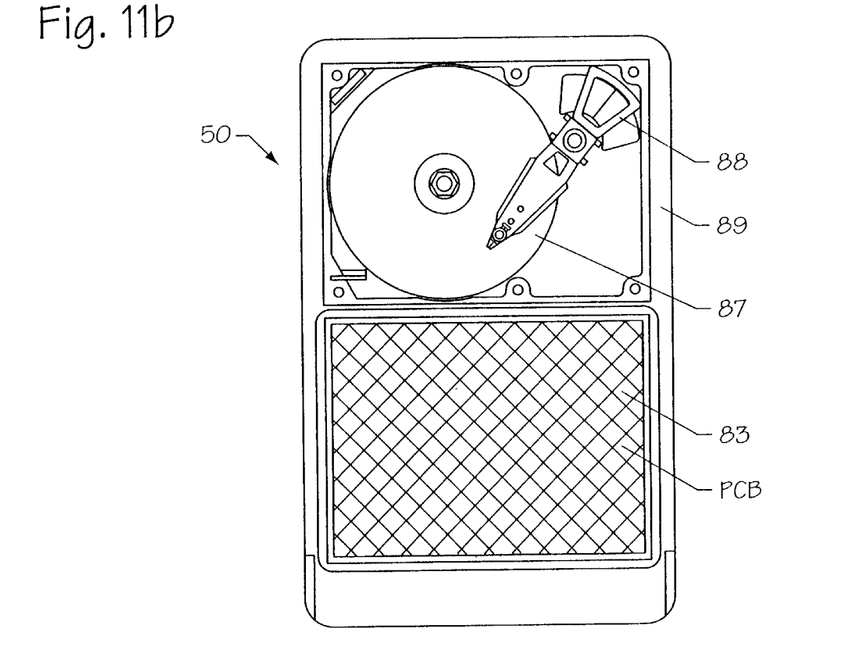

It is appreciated that in either the embodiments of FIGS. 9 or 10 that the external interconnect for the PCMCIA disk cards are disposed along a peripheral side of the frame. The actual wires or interconnects that are connected to the external port may be imbedded within the frame itself. Typically, the frame comprises a plastic material in which the metal interconnects are easily imbedded. Forming the interconnects in this way allows the card to be inserted into a standard PCMCIA computer slot, thereby automatically connecting the disk storage unit to the computer. Similarly, the interconnects between the PC board and the transducers themselves can also be through wires or connectors imbedded within the PCMCIA plastic frame, FIGS. 11a and 11b illustrate a top-view of the disk storage units 40 and 50 of the present invention. Each of the views shows the drive unit with the top cover removed and, in the case of disk storage unit 40, with the printed circuit board displaced so that the relative location of the actuator, bearings, and disk can be seen.

We claim:

1. A disk storage unit comprising:
   a hub disposed within a central opening of a frame, said hub rotationally supporting a disk medium;
   a hydrodynamic bearing for rotational movement of said hub within said central opening about an axis of rotation, said hydrodynamic bearing comprising a pair of balls and a pair of sockets, each of said sockets having a spherical section and a cylindrical section, said pair of balls being disposed within said spherical sections of said pair of sockets, respectively, along said axis of rotation on opposite sides of said hub, either said pair of sockets or said pair of balls being affixed to said hub, wherein a gap is formed between each socket and its associated ball, said gap being filled with a liquid lubricant to facilitate rotational movement of said hub about said rotational axis, said lubricant forming a stable meniscus between each of said balls and said cylindrical section of each of said sockets, the disk medium being contained within said central opening.

2. The disk storage unit of claim 1 wherein said cylindrical sections of said pair of sockets extend beyond a hemispherical point of each of said pair of balls being disposed within said spherical sections of said pair of sockets, respectively.

3. The disk storage unit of claim 1 wherein said spherical sections of said sockets transition into said cylindrical sections at a hemispherical point of each of said pair of balls being disposed within said spherical sections of said pair of sockets, respectively.

4. A disk storage unit comprising:
   a hub disposed within a central opening of a frame, said hub rotationally supporting a disk medium;
   a hydrodynamic bearing for rotational movement of said hub within said central opening about an axis of rotation, said hydrodynamic bearing comprising a pair of balls and a pair of sockets, each of said sockets having a spherical section and a cylindrical section, said pair of balls being disposed within said spherical section of said pair of sockets, respectively, along said axis of rotation on opposite sides of said hub, either said pair of sockets or said pair of balls being affixed to said hub, wherein a gap is formed between each socket and its associated ball, said gap being filled with a liquid lubricant to facilitate rotational movement of said hub about said rotational axis, said lubricant forming a stable meniscus between each of said balls and said cylindrical section of each of said sockets, said disk medium being contained within said central opening;
   a motor means for rotating said hub within said central opening, said motor means comprising at least a first coil attached to either a top or a bottom of said frame and an annular magnet attached to said hub, said disk medium being attached to said hub such that energizing said at least said first coil causes said hub, said magnet and said disk medium to rotate about said axis of rotation.

5. The disk storage unit of claim 4 further comprising an actuator means for positioning a transducer over said disk medium.

6. The disk storage unit of claim 5 wherein said actuator means comprises a pair of flexure arms mounted to a corresponding pair of actuator arms, said actuator arms being attached to a voice coil magnet disposed adjacent to an actuator coil, energy supplied to said actuator coil causing said actuator means to pivot about an actuator bearing.

7. The disk storage unit of claim 5 wherein said actuator means comprises a pair of flexure arms mounted to an actuator body, said actuator body being attached to an actuator coil disposed adjacent to a magnet, energy supplied to said actuator coil causing said actuator body to pivot about an actuator bearing.

8. A disk storage unit comprising:
   a frame having a central opening;
   a disk drive assembly providing readable and writable information storage on a disk medium, said disk drive assembly being housed within said opening of said frame;
   a base plate attached to a first side of said frame, said disk drive assembly being mounted to said base plate;
   a first cover positioned adjacent a second side of said frame for enclosing said disk drive assembly within said central opening;
   a printed circuit board (PCB) mounted on an opposite side of said cover from said disk drive assembly, said PCB housing an electronic circuit means for controlling the operation of said disk drive assembly;
   a printed circuit board cover enclosing said PCB in a space disposed between said printed circuit board cover and said first cover;
   a connector configured to be compatible with Personal Computer Memory Card International Association (PCMCIA) standards coupled to said electronic circuit means for providing external electrical connection to said disk storage unit;
   wherein said disk drive assembly further comprises;
      a hub disposed within said central opening for rotationally supporting said disk medium; and
      a hydrodynamic bearing for rotational movement of said hub within said central opening about an axis of rotation, said hydrodynamic bearing comprising a pair of ball bearings and a pair of sockets, each of said sockets having a first base section and a cylindrical section, said pair of ball bearings being disposed within said first base sections of said pair of sockets, respectively, along said axis of rotation on opposite sides of said hub, either said pair of sockets or said pair of ball bearings being affixed to said hub, wherein a gap is formed between each socket and its associated ball bearing, said gap being filled with a liquid lubricant to facilitate rotational movement of said hub about said rotational axis, said lubricant forming a stable meniscus between each of said ball bearings and said cylindrical section of each of said sockets.

9. The disk storage unit of claim 8 wherein the overall thickness of said disk storage unit is approximately 5.0 mm thick.

10. The disk storage unit of claim 8 wherein said frame has a thickness which is greater than or equal to approximately 3.3 mm and less than or equal to approximately 10.5 mm.

11. The disk storage unit of claim 10 wherein said thickness of said frame is approximately 3.3 mm.

12. The disk storage unit of claim 8 wherein said disk drive assembly further comprises a motor means for rotating said hub within said opening, said motor means comprising at least a first coil attached to either said first cover or said base plate and an annular magnet attached to said hub, said disk medium being attached to said hub such that energizing at least said first coil causes said hub, said magnet and said disk medium to rotate about said axis of rotation.

13. The disk storage unit of claim 12 wherein said disk drive assembly further comprises an actuator means for positioning a transducer over said disk medium.

14. The disk storage unit of claim 13 wherein said actuator means comprises a pair of flexure arms mounted to a corresponding pair of actuator arms, said actuator arms being attached to a voice coil magnet disposed adjacent to an actuator coil, energy supplied to said actuator coil causing said actuator means to pivot about an actuator bearing.

15. The disk storage unit of claim 13 wherein said actuator means comprises a pair of flexure arms mounted to an actuator body, said actuator body being attached to an actuator coil disposed adjacent to a magnet, energy supplied to said actuator coil causing said actuator body to pivot about an actuator bearing.

16. The disk storage unit of claim 15 wherein said actuator bearing comprises a ball bearing assembly disposed about an actuator shaft.

17. The disk storage unit of claim 15 wherein said flexure arms are ball staked directly to said actuator arms.

\* \* \* \* \*